(12) United States Patent
Boland et al.

(10) Patent No.: US 7,732,974 B1
(45) Date of Patent: Jun. 8, 2010

(54) ELECTROSTATIC POWER GENERATOR CELL AND METHOD OF MANUFACTURE

(75) Inventors: Justin S. Boland, Altadena, CA (US); Brian M. Ronald, Thousand Oaks, CA (US); Kin Ming Kwan, Arcadia, CA (US); Jordan H. Eber, Pasadena, CA (US)

(73) Assignee: Justin Boland, Altadena, CA (US)

( * ) Notice: Subject to any disclaimer, the term of this patent is extended or adjusted under 35 U.S.C. 154(b) by 682 days.

(21) Appl. No.: 11/600,404

(22) Filed: Nov. 15, 2006

(51) Int. Cl.
*H01L 41/08* (2006.01)

(52) U.S. Cl. .................................. 310/309
(58) Field of Classification Search ............... 310/309
See application file for complete search history.

(56) References Cited

U.S. PATENT DOCUMENTS

| | | | |
|---|---|---|---|
| 2,288,600 A | | 7/1942 | Arndt Jr. |
| 3,463,942 A | | 8/1969 | Mellon |
| 4,185,621 A | | 1/1980 | Morrow |
| 4,387,318 A | | 6/1983 | Kolm et al. |
| 4,442,372 A | | 4/1984 | Roberts |
| 4,814,657 A | | 3/1989 | Yano et al. |
| 4,982,316 A | | 1/1991 | Nakayama |
| 5,050,058 A | | 9/1991 | April et al. |
| 5,650,923 A | | 7/1997 | Suzuki et al. |
| 5,682,075 A | * | 10/1997 | Bolleman et al. ........... 310/309 |
| 5,687,069 A | | 11/1997 | Rundkvist et al. |
| 5,801,475 A | | 9/1998 | Kimura |
| 5,838,138 A | | 11/1998 | Henty |
| 6,031,317 A | | 2/2000 | Chen |
| 6,101,113 A | | 8/2000 | Paice |
| 6,169,391 B1 | | 1/2001 | Lei |
| 6,252,336 B1 | | 6/2001 | Hall |
| 6,433,465 B1 | | 8/2002 | McKnight et al. |
| 6,538,910 B1 | | 3/2003 | Spitz et al. |
| 6,737,789 B2 | | 5/2004 | Radziemski et al. |
| 7,057,330 B2 | | 6/2006 | Buhler et al. |
| 7,105,952 B2 | | 9/2006 | Divan et al. ................... 307/98 |
| 7,105,982 B1 | | 9/2006 | Hagood, IV et al. ......... 310/319 |
| 7,192,202 B2 | * | 3/2007 | Matsuki et al. ............. 396/358 |

(Continued)

OTHER PUBLICATIONS

Boland et al.: Arrayed Liquid Rotor Electret Power Generator Systems; Micro Electro Mechanical Syst, 2005. MEMS 2005, 18th IEEE Int'l Conf on Jan. 30-Feb. 3, 2005 p. 618-621.

(Continued)

*Primary Examiner*—Mark Budd
(74) *Attorney, Agent, or Firm*—Blakely Sokoloff Taylor & Zafman, LLP

(57) ABSTRACT

Electrostatic power generator cell architectures having high generator output and a method of manufacture. In one embodiment, parasitic capacitances are reduced by reducing overlap between walls of the chamber and electrodes of the generator cell. In another embodiment, generator component materials are selected to reduce triboelectric effects to improve the coupling of kinetic energy to electrical output, thereby increasing generator output. In a further embodiment, the high permittivity material is selected to increase the modulation of the variable capacitors in the power generator to increase generator output. In still another embodiment, the physical dimensions of the generator cell components are reduced to increase power density. In an additional embodiment, a physical dimension of the generator chamber is based on the dominant motion the generator will be exposed to in a particular application.

30 Claims, 8 Drawing Sheets

U.S. PATENT DOCUMENTS

| | | | |
|---|---|---|---|
| 7,211,923 B2 * | 5/2007 | Potter | 310/309 |
| 7,236,380 B1 | 6/2007 | Spitz et al. | |
| 7,378,775 B2 * | 5/2008 | Potter | 310/309 |
| 7,446,450 B2 * | 11/2008 | Boland et al. | 310/309 |
| 7,449,811 B2 * | 11/2008 | Suzuki et al. | 310/309 |
| 7,453,187 B2 | 11/2008 | Richards et al. | |
| 2004/0007877 A1 | 1/2004 | Boland et al. | |
| 2004/0016120 A1 | 1/2004 | Boland et al. | |
| 2005/0146220 A1 | 7/2005 | Hamel et al. | 307/44 |
| 2006/0077762 A1 | 4/2006 | Boland et al. | |
| 2006/0116102 A1 | 6/2006 | Brown et al. | |
| 2006/0227582 A1 | 10/2006 | Wei et al. | |
| 2007/0241907 A1 | 10/2007 | Bauchot et al. | |
| 2008/0164851 A1 | 7/2008 | Ganev et al. | |
| 2008/0165553 A1 | 7/2008 | Swamy | |
| 2008/0186749 A1 | 8/2008 | Blanchery | |
| 2008/0259663 A1 | 10/2008 | Perkinson | |

OTHER PUBLICATIONS

Huang et al.: Liquid-Rotor Electret Power Generator energized by a MEMS-Based Pulsed Combustor; in Proceedings of Power MEMS '04 p. 171-174, Kyoto, Japan.

Non-Final Office Action for U.S. Appl. No. 11/600,388 Mailed Dec. 3, 2008, 10 pages.

Non-Final Office Action for U.S. Appl. No. 11/600,406, Mailed Feb. 2, 2009, 11 pages.

Non-Final Office Action for U.S. Appl. No. 11/600,407 Mailed Mar. 19, 2009, 11 pages.

* cited by examiner

ELECTROSTATIC POWER GENERATOR CELL AND METHOD OF MANUFACTURE

CROSS-REFERENCE TO RELATED APPLICATIONS

This patent application is related to the following U.S. patent applications:

Non-provisional patent application entitled "Architecture for Multiple Cell Electrostatic Power Generators" having Ser. No. 11/600,405, filed the same day as this patent application.

Non-provisional patent application entitled "Rectifier and Power Conditioner for Multi-Phase High Voltage, Low Current Sources Supplying Low Voltage Loads" having Ser. No. 11/600,388, filed the same day as this patent application.

Non-provisional patent application entitled "Vibration Driven Electrical Power Supply" having Ser. No. 11,600,406, filed the same day as this patent application.

Non-provisional patent application entitled "Systems and Methods Employing Electrostatic Power Generators" having Ser. No. 11/600,407, filed the same day as this patent application.

BACKGROUND

1. Field

The present invention relates to power generators. More particularly this invention relates to electrostatic power generators configured to convert kinetic energy into electrical energy.

2. Discussion of Related Art

Various power generators have been developed to convert kinetic energy into electrical energy. For example, there are electromagnetic generators, piezoelectric and cantilevered impulse power generators. Virtually all of these generators however utilize a resonant member. Resonant members only operate well over a narrow frequency range, while real world environments have a broad frequency range. Therefore, there remains a need for a power generator with greater robustness and flexibility than resonant generators provide.

DETAILED DESCRIPTION

Figure 1A:
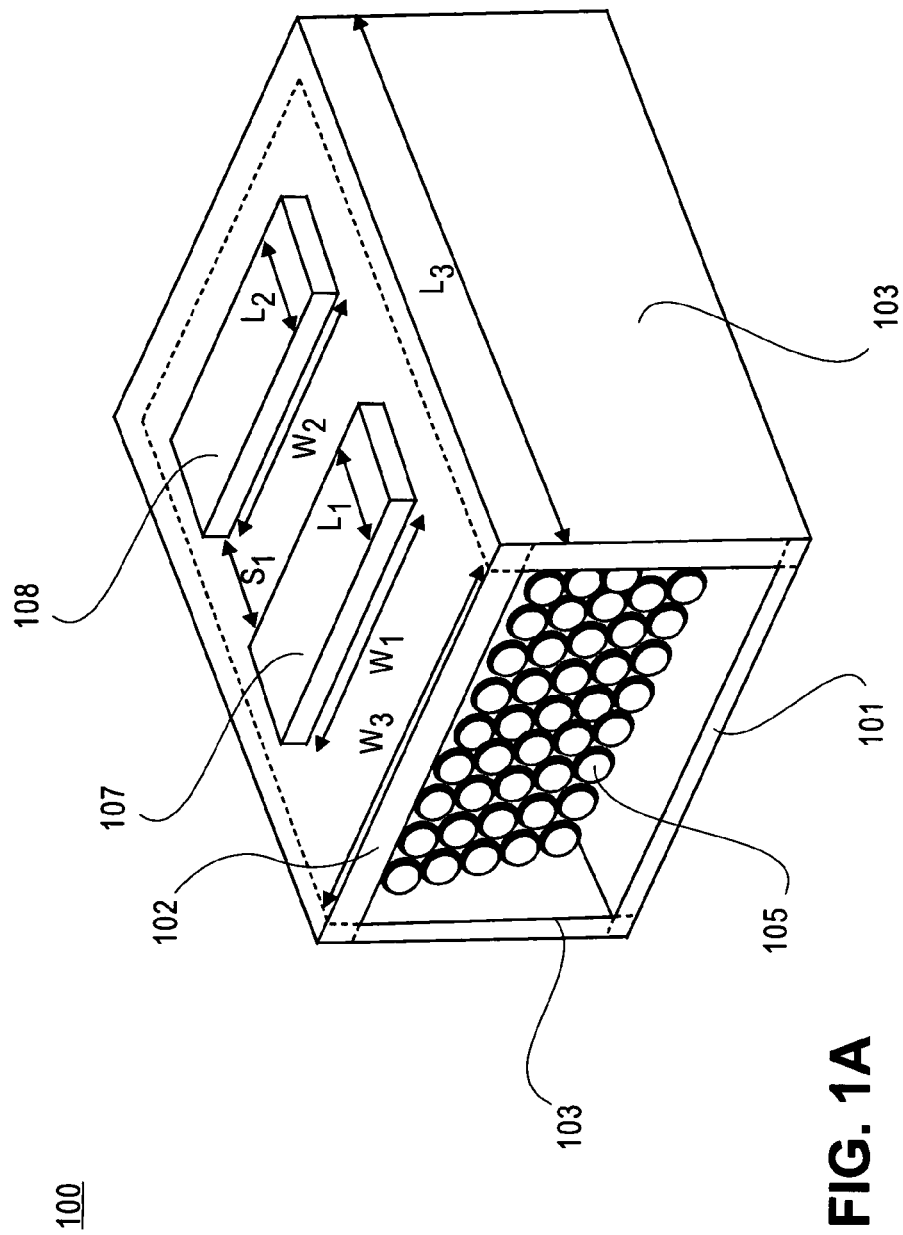
FIGS. 1A-1C illustrate prospective and cross-sectional views of electret power generator cells in accordance with embodiments of the invention.

Embodiments of the invention include architectures for an electrostatic power generator comprising, an electret, and a means to vary a capacitance with kinetic energy to produce electrical power. Certain embodiments may be practiced without one or more of these specific details, or in combination with other known methods and materials. In the following description, numerous specific details are set forth, such as specific materials, dimensions and processes, etc., in order to provide a thorough understanding of the invention. In other instances, well-known manufacturing techniques have not been described in particular detail in order to not unnecessarily obscure the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

Described herein are electrostatic power generator cell architectures having high electrical power output and their method of manufacture. An electrostatic power generator is a fixed-charge, variable-permittivity displacement current device, which has been engineered to convert significant amounts of kinetic energy into usable electrical power for the purposes of driving external devices. An electrostatic power generator is capable of harvesting kinetic energy from the ambient environment. Power generators relying on electrostatics rather than electromagnetic forces offer advantages of scalability and simplicity. Electrostatic power generators have the potential to generate power for a wide range of kinetic energy inputs because, unlike conventional piezoelectric and cantilevered generators, their design does not require a resonant member. High electrical output at the cell level translates into high power density which is a figure of merit for small scale power generators. The size of the power generator required to provide this amount of power directly bears on the portability of the device. For example, many portable applications require milliwatts of power to operate. Without a sufficient power density, the generator will be unable to provide enough power in a portable form factor.

Generally, higher generator output can be achieved through reductions in parasitics associated with the components of the cell. In one embodiment, parasitic capacitances are reduced by reducing overlap between walls of the chamber and electrodes of the generator cell. In another embodiment, generator component materials are selected to reduce triboelectric effects to improve the coupling of kinetic energy to electrical output, thereby increasing generator output. In a further embodiment, the high permittivity material is selected to increase the modulation of the variable capacitors in the power generator to increase generator output. In yet anther embodiment, the high permittivity material is configured within the cell to improve generator output. In still another embodiment, the physical dimensions of the generator cell are reduced to increase power density. In another embodiment a physical dimension of the generator chamber is based on the dominant motion the generator will be exposed to for a particular application.

Figure 1B:
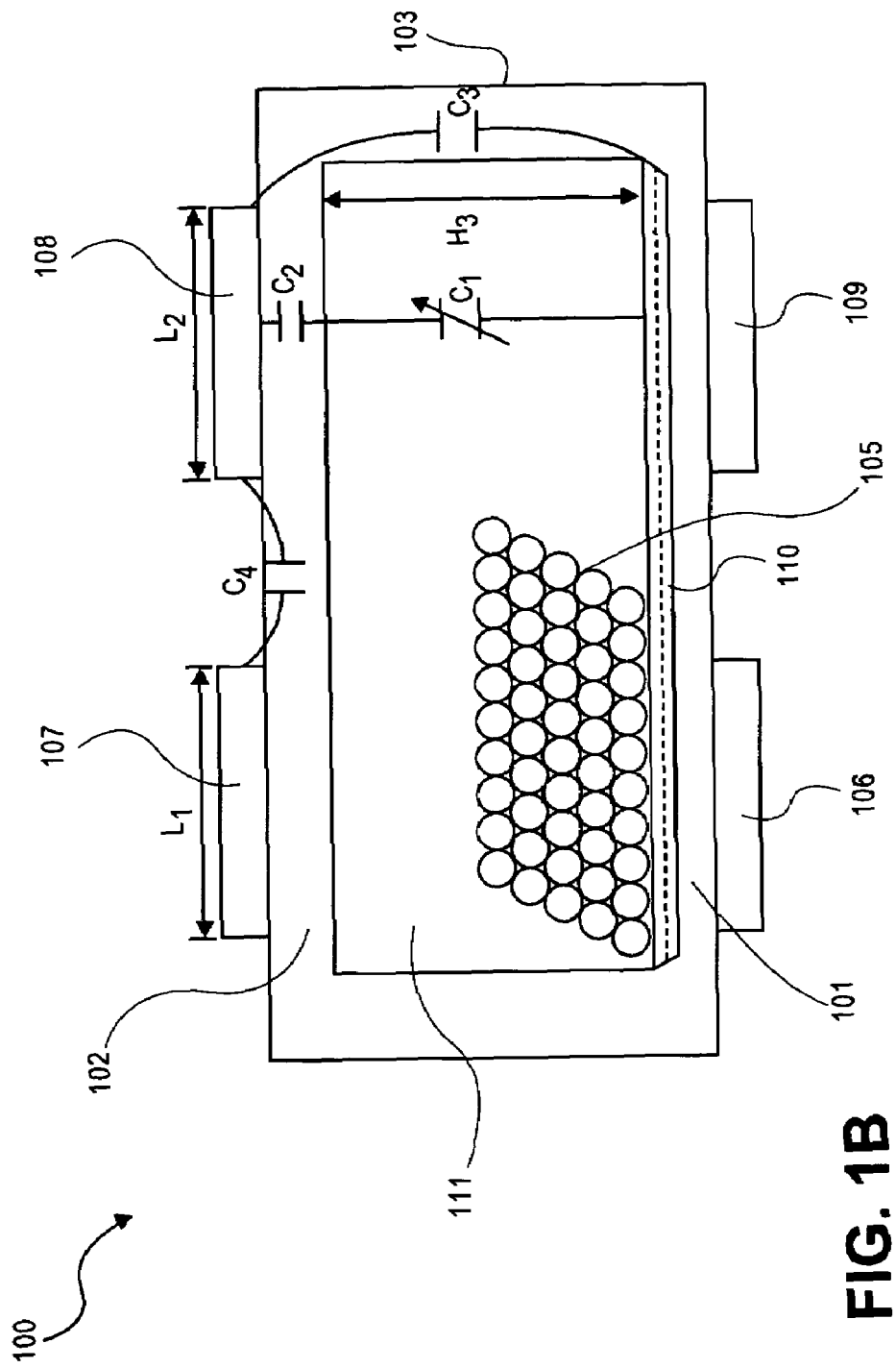
Figure 1C:
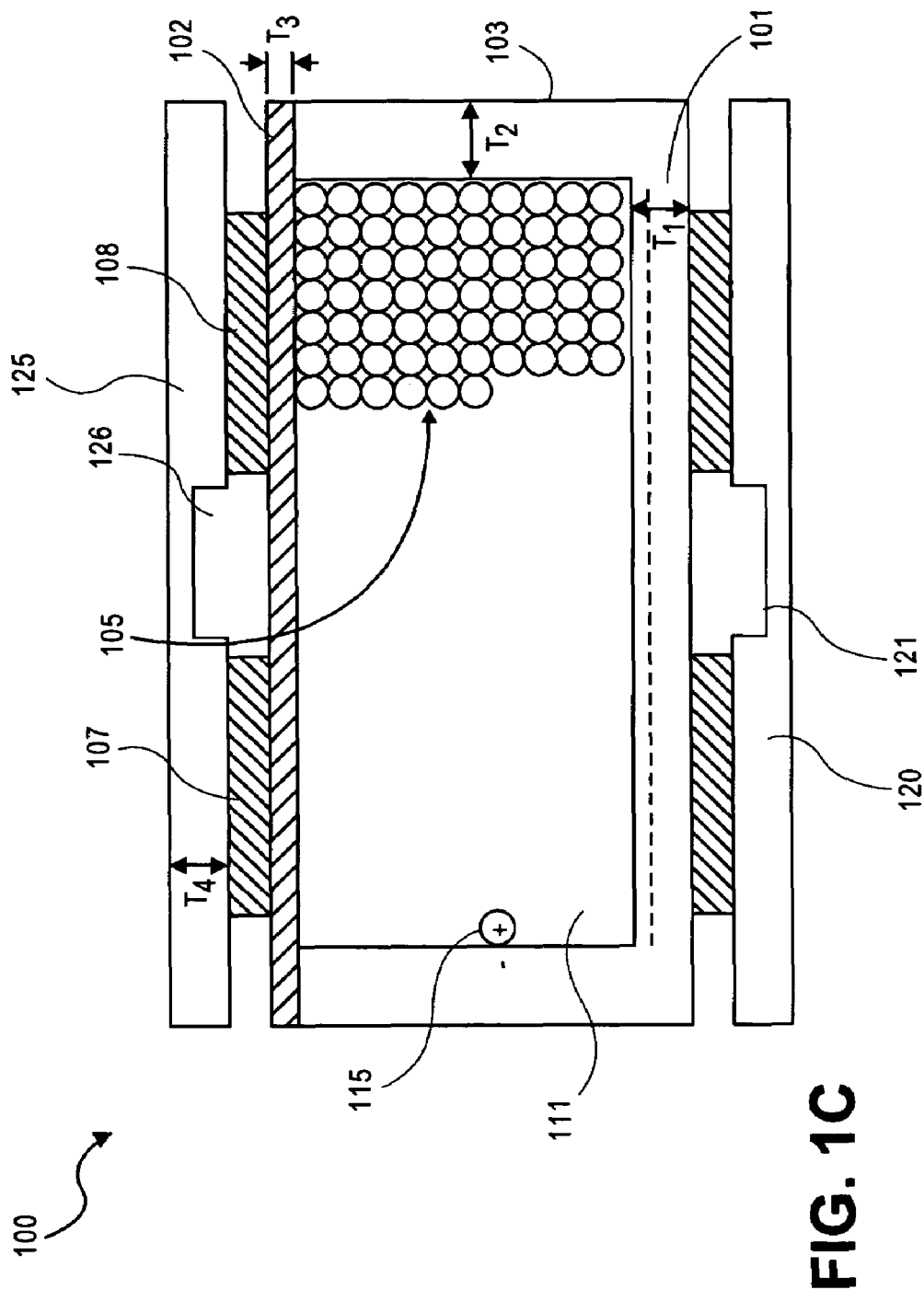

FIG. 1A depicts a prospective view of a high output electrostatic power generator cell 100. FIGS. 1B and 1C depict cross-sectional views of alternate embodiments of a high output electrostatic power generator cell 100. Referring to FIG. 1B, the cell 100 may be used as a basic building block to form larger power generating structures with greater power output. Cell 100 comprises a first pair of electrodes 106 and 107 and a second pair of electrodes 108 and 109 encompassing an electret 110 and chamber 111. An electret is a dielectric material that has a quasi-permanent electric charge or dipole polarization. An electret generates internal and external electric fields, and is the electrostatic equivalent of a permanent magnet. The electret may be conceptualized as the middle plate of two capacitors in series, however it must be noted that the electret is not an electrode. Each pair of electrodes (106, 107 and 108, 109) forms a capacitor with the electret 110 providing fixed charge. Between any two electrodes (e.g. 106 and 107, 107 and 108, 108 and 109, 109 and 106) a fixed and variable capacitor is formed. The fixed capacitors are parasitic while the variable capacitors can be harnessed to produce power. The capacitor formed between the electret 110 and electrode 107 and the electret 110 and electrode 108 have a variable capacitance dependent on the different permittivity of the chamber gap and a high permittivity material 105 occupying a portion of the chamber 111. The high permittivity material 105 is mobile within chamber 111 such that, during use, reciprocating, vibrating, impulse, or random motion of cell 100 imparts relative motion between high permittivity material 105 and electrodes 107 and 108 causing a change in the capacitance between electret 110 and electrode 107 and a change in the capacitance in the electret 110 and electrode 108.

The capacitance (C) associated with each of pair of parallel electrodes (106, 107 and 108, 109) is proportional to the surface area (A) of the electrode facing the electret 110, proportional to the permittivity ($\in$) of the material between the electrode and the electret 110, and inversely proportional to the distance (d) between the electrode and the electret 110 as shown by the relationship in Equation 1:

$$C = \frac{\varepsilon A}{d} \quad (1)$$

When the portion of the chamber 111 between electrode 107 and electret 110 is empty or only occupied by air, the permittivity ($\in_2$) associated with electrode 107 is close to the permittivity of free space ($\in_0$), the lowest possible permittivity. When the portion of chamber 111 between the second electrode 107 and the electret 110 is occupied by the high permittivity material 105, then the permittivity ($\in_2$) associated with electrode 107 is close to the permittivity of the high permittivity material. The same change in permittivity with relative motion of the high permittivity material 105 occurs for the second electrode pair, 108 and 109, but is 180 degrees out of phase with the first electrode pair 106 and 107.

When an electrical circuit (not shown) is connected to electrodes 106, 107, 108 and 109 of generator cell 100, the variable capacitance of generator cell 100 imparts a voltage modulation V, approximated by:

$$V = \frac{Q}{C} \quad (2)$$

Electrical current across the circuit which can then be harnessed to generate electricity from the kinetic energy imparting motion to generator cell 100.

In the embodiment depicted in FIGS. 1A, 1B and 1C, the cell geometry is box-like, having six sides to enclose a chamber. Referring to FIG. 1B, chamber 111 is defined by a sidewall 103 joining the floor 101 to ceiling 102. Throughout this specification, reference to sidewall 103 should be understood to include any surface forming a perimeter of chamber 111 between floor 101 and ceiling 102. In a box-like cell embodiment, sidewall 103 forms four sides of the box, while in a cylindrical cell embodiment (not shown), sidewall 103 forms a circular perimeter between floor 101 and ceiling 102. Internal to the chamber 111 is a high permittivity material 105 mobile within chamber 111. Floor 101 comprises an electret 110 between the chamber 111 and coplanar electrodes 106 and 109, each external to the chamber floor 101. Electrode 106 is coupled to electrode 107 and electrode 109 is coupled to electrode 108 to form a first and second pair of parallel electrodes adjacent to the chamber 111. Thus, cell 100 has a variable permittivity capacitor, $C_1$, associated with the volume of chamber 111 between electret 110 and electrode 108 which is either empty, as shown in FIG. 1B, or filled to some extent by the high permittivity material 105, as shown in FIG. 1C. Cell 100 utilizes a pair of coplanar electrodes, 107 and 108, as shown in FIGS. 1A-1C to increase power density by providing two complementary variable permittivity capacitors in the same space that is required to operate a single variable permittivity capacitor.

In an embodiment of the invention, parasitic fringing capacitances within the generator cell are reduced by limiting the overlap of the electrodes with the chamber sidewalls. The high output electret power generator cell is a device of minimum dimension and maximum capacitances. For this reason, generator cell architectures minimizing fringing capacitances achieve highest power density. As shown in FIG. 1A, each electrode has an associated length and width. For example, in FIG. 1A electrode 107 has a length $L_1$ and width $W_1$. Electrode 108 has a length, $L_2$, and width, $W_2$. Similarly, the chamber 111 has an associated length, $L_3$, and width, $W_3$, defined by the distance between opposite surfaces of sidewall 103. Depending on the relative lengths and widths of the electrodes to those of the chamber 111, the electrodes will be more or less proximate to the sidewall 103. As shown in FIG. 1B, a fringing capacitance, $C_3$, exists between electrodes 108 and 109 through sidewall 103, is in parallel to the variable capacitor, $C_1$. Fringing capacitance $C_3$ reduces the electrical output of cell 100 for a given amount of input kinetic energy because parallel capacitors are additive resulting in a larger total capacitance $C_1+C_3$ coupling electrode 108 to the electret 110 even when the variable capacitor $C_1$ reaches a minimum value. With electrode 108 more strongly coupled to the electret 110, less image charge can be formed in electrode 109 for a given fixed charge within electret 110 and therefore the output voltage swing is decreased. Therefore, in a particular embodiment, to reduce the parasitic effect of the fringing capacitance $C_3$, at least one of the chamber width $W_3$ and chamber length $L_3$ is greater than an electrode width (e.g. $W_1$, $W_2$). In another embodiment, wherein a plurality of electrodes (e.g. 107 and 108) with spacing $S_1$ span the chamber length $L_3$ the total length of the electrodes and spaces, $L_1+S_1+L_2+ \ldots S_n+L_n$ is less than the chamber length $L_3$. In a further embodiment, an electrode width (i.e. $W_1$, $W_2$) is at least 0.1% less than the chamber width $W_3$. In an alternate embodiment, in recognition that the fringing capacitance $C_3$ and variable capacitance $C_1$ are also a function of the chamber height $H_3$ electrode width (i.e. $W_1$, $W_2$) is at least less than the chamber width $W_3$ by 0.1% of chamber height $H_3$:

$$W_1 \leq W_3 - 0.001 H_3 \quad (3)$$

In an embodiment of the invention, parasitic fringing capacitance $C_3$ is reduced with sidewall 103 comprising low permittivity materials. In a particular embodiment, the sidewall 103 comprises a material having a dielectric constant less than 3.5. Sidewall 103 can be of any commonly known low-k films, such as, but not limited to fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide (e.g. Kapton® Type 150 FCR available from DuPont), fluorinated glass, carbon doped silicon oxides, and porous dielectrics with 1-10% porosity. In another embodiment, first dielectric film 230 is a commonly known thermoplastic or thermoset material, such as, but not limited to polycarbonate, polyolefins, polymethylmethacrylate, polystyrene, acetals, polyphenyloxide, nylons, polyester, polyetheretherketones (PEEK), and liquid crystal polymers.

In an embodiment of the invention, parasitic fringing capacitance $C_4$ is reduced with a ceiling 102 comprising low permittivity materials. Fringing capacitance $C_4$ between the coplanar electrodes 107 and 108 is a result of these electrodes being 180° out of phase during operation of the generator. The fringing capacitance $C_4$ is parasitic in a manner analogous to that of fringing capacitance $C_3$ associated with sidewall 103 previously discussed. In a particular embodiment, the ceiling 102 comprises a material having a dielectric constant less than 3.5. Ceiling 102 can be of any commonly known low-k films, such as, but not limited to fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide (e.g. Kapton® Type 150 FCR available from DuPont), polyvinylidene fluoride, (PVDF), fluorinated glass, carbon doped silicon oxides, and porous dielectrics with 1-10% porosity.

In a further embodiment of the invention, the thickness of the ceiling 102 separating the electrodes 107 and 108 from chamber 111 is minimized. The cell ceiling 102 contains the mobile high permittivity material 105 in cell 100 and protects electrodes 107 and 108 from mechanical damage resulting from contact with the moving high permittivity material 105. However, it is desirable to minimize the thickness of ceiling 102 in order to increase the series capacitance $C_2+C_1$ as approximated by Equation 4:

$$C_2 + C_1 = \frac{C_1 C_2}{C_1 + C_2} \quad (4)$$

Because the total capacitance $C_2+C_1$ can never be greater than the capacitance of the cell ceiling $C_2$, the maximum voltage differential between electrodes 108 and 109 is limited by $C_2$. Thus, increasing the capacitance $C_2$ increases the amount of power the cell 100 can deliver. As indicated by Equation 1, this can be achieved by either increasing the permittivity of the ceiling 102 through choice of materials or by reducing the thickness of the ceiling 102. Embodiments reducing the thickness of the ceiling 102 are advantageous given that both the fringing capacitance $C_4$ and series capacitance $C_2$ are reduced as the thickness of ceiling 102 is reduced while increasing the permittivity of sidewall 102 to reduce capacitance $C_2$ results in a detrimental increase in fringing capacitance $C_4$. The lower limit of thickness $T_3$ is constrained by the need to protect the electrodes from direct contact with high permittivity material 105, which could cause electrostatic discharge (ESD) events that could render the device inoperable. Thus, cell reliability limits the ultimate thickness of $T_3$. Therefore, in an embodiment of the invention, as shown in FIG. 1C, ceiling 102 is a dielectric film having a minimal thickness. In a particular embodiment, $T_3$ is between 0.1 mil and 5 mil.

Similarly, sidewall 103 must provide mechanical strength sufficient to withstand impacts with high permittivity material 105 while being as thin as possible to reduce the parasitic fringing capacitance $C_3$. Thus, in a further embodiment, sidewall 103 is a dielectric film having a thickness $T_2$ between 5 mil and 20 mil, dependent on the height $H_3$ of the cell, which in certain embodiments ranges from between approximately 0.25 mm to approximately 1 mm.

As previously discussed, it is advantageous to reduce the thickness of the ceiling thickness $T_3$ to maximize capacitance $C_2$. However, thicknesses below approximately 2 mil lack sufficient structural rigidity to support electrodes across chamber length $L_3$ and width $H_3$. As discussed in more detail below, $L_3$ may be 5 mm or more and $H_3$ can be even higher, for example 10 mm. Therefore, in an embodiment of the invention, a first substrate 120 and second substrate 125 are positioned external to coplanar electrodes 106, 109 and coplanar electrodes 107, 108 to provide structural support without increasing capacitance $C_2$. Ultimately, there is a tradeoff between packing density of multiple cells and efficiency of each cell, both of which are affected by the location of substrates 120 and 125. The substrate can be of any commonly known material that will provide adequate support. In an embodiment, substrates 120 and 125 are a commonly known low-k materials having a dielectric constant below approximately 3.5 to minimize parasitic fringing capacitance between coplanar electrodes through the substrate as well as to minimize coupling between adjacent generator cells when arrayed. A low-k material such as, but not limited to fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide (e.g. Kapton® Type 150 FCR available from DuPont), polyvinylidene fluoride, (PVDF), fluorinated glass, carbon doped silicon oxides, or porous dielectrics with 1-10% porosity may be used for substrates 120 and 125. In a particular embodiment, substrates 120 and 125 each have a thickness $T_4$ of between approximately 1 mil and 15 mil. In an alternate embodiment, substrates 120 and 125 have a notch 121 and 222 on one or both sides of the substrate extending between the coplanar electrodes for at least the width of one of the electrodes (e.g. $W_1$ or $W_2$ in FIG. 1A) to further reduce the capacitive coupling between coplanar electrodes 106 and 109 or 107 and 108.

Referring to FIG. 1C, in an embodiment of the invention, at least one of the floor 101, ceiling 102 and sidewall 103 is a material that can dissipate surface charge. In an embodiment, at least one of the floor 101, ceiling 102 and sidewall 103 is an electrostatic dissipative (ESD) polymer or inherently static dissipative (ISD) polymer. In another embodiment, at least one of the floor 101, ceiling 102 and sidewall 103 is a material with a low surface resistivity. Both dissipative polymers and low surface resistivity materials advantageously reduce accumulation of static charge on the surfaces of the floor 101, ceiling 102, and sidewall 103 interior to the chamber. Static charge may be the result of a triboelectric effect from friction as the floor 101, ceiling 102, and sidewall 103 move relative to high permittivity material 105. Surface charge accumulation can cause high permittivity material 105 to electrostatically adhere to the floor 101, ceiling 102 or sidewall 103, as represented in FIG. 1C by high permittivity bead 115. So, instead of remaining at rest as cell 100 is displaced, high permittivity material 105 becomes affixed to cell 100, reducing the amount of electrical power output for a given kinetic energy input. In one embodiment, the floor 101, ceiling 102, or sidewall 103 have a surface resistivity less than $10^{14}$ ohms/square. In a particular embodiment, floor 101, ceiling 102, or sidewall 103 are polyetherimide (e.g. Ultem® available from General Electric) having a surface resistivity between approximately $10^6$ and $10^{12}$ ohms/square. In an alternate embodiment, at least one of the surfaces of floor 101, ceiling 102, and sidewall 103 interior to the chamber 111 is exposed to a surface treatment such as, but not limited to, an acetone rinse, to lower the surface resistivity. Such surface treatment embodiments enable the ceiling 102 to have a lower surface resistivity on the surface interior to chamber 111 while the surface resistivity external to the chamber remains high to prevent leakage between electrodes 107 and 108.

Referring back to FIG. 1A, in embodiments of the invention, the chamber length $L_3$ is optimized for a particular electret power generator application. Vibrations in 3-dimensional space can be quantified by root mean square (RMS) magnitudes in 3 perpendicular axes. The axis with the largest magnitude of vibration is referred to as the "dominant vibration." In one such embodiment, to achieve the highest output, the chamber length $L_3$ is designed to be no greater than the peak-to-peak amplitude of the dominant vibration of a particular application. The dominant vibrational displacement can be made parallel to chamber length $L_3$ with a point-of-use alignment of generator cell 100. For example, traveling in a vehicle at highway speed may tend to produce a dominant vibration with peak-to-peak amplitude on the order of 1 mm at a particular location in the vehicle where generator cell 100 is to be positioned during use. Thus, in this example, an efficient power generator cell 100 for this application is one manufactured with a chamber length $L_3$ no greater than 1 mm. Therefore, in certain embodiments of the invention the "stroke" of the generator, equal to length of the chamber $L_3$ is tailored to a particular application's dominant vibration as measured in-situ with a commonly available vibration meter.

In another embodiments, chamber length $L_3$ is designed to be significantly less than the dominant vibration of a particular application. Therefore, during use, generator cell 100 is displaced a distance significantly more than chamber length $L_3$ to ensure no further motion of high permittivity material 105 relative to generator cell 100 is possible. This is advantageous when high permittivity material 105 is deformable upon impact with sidewall 103. As discussed further below, a high permittivity material that is deformable offers advantageous space filling characteristics. In certain embodiments, chamber length $L_3$ is between 0.75 mm and 5 mm.

The volume of chamber 111 is partially occupied with a high permittivity material 105 that is movable relative to the cell 100 to create a variable permittivity capacitor as described above. In an embodiment, the chamber volume is at least partially evacuated to lower the permittivity of empty chamber volume. In a further embodiment, the high permittivity material 105 occupies between 30% and 50% of the total volume. In a particular embodiment, a solid mass of high permittivity material roughly spans the height $H_3$ and width $W_3$ of chamber 111 and has a length less than approximately half the chamber length $L_3$. In one such embodiment, the high permittivity material 105 is a single solid mass occupying between less than 50% of the chamber volume. As shown in FIGS. 1A and 1B, in an alternate embodiment, a plurality of particles additively occupies a total volume less than 50% of the chamber volume. A high permittivity material 105 having a volume less than 50% of the volume of chamber 111 minimizes fringing capacitance through the high permittivity material between the electrodes surrounding the empty portion of chamber 111 at end of a given generator stroke. For example, as illustrated in FIG. 1C, when high permittivity material 105 increases the capacitance of the capacitor associated with electrode 108, high permittivity material 105 will also increase the capacitance associated with electrode 107 if high permittivity material 105 remains in close proximity to electrode 107. Increasing the minimum capacitance with such a fringing capacitance disadvantageously prevents the capacitor associated with electrode 107 from reaching as high of a voltage maximum. Therefore, embodiments employing a volume of high permittivity material 105 that is less than 50% of the volume of chamber 111 increases generator output by minimizing the fringing capacitance of the high permittivity material.

High permittivity material 105 has a relatively high density. The higher the density, the more mass for a given size and the greater the inertia of high permittivity material 105. Higher inertia increases the relative motion between high permittivity material 105 and cell 100, improving the power output of the cell by transforming a greater fraction of the kinetic energy input into electrical energy. In an embodiment, high permittivity material 105 is any commonly known material having a density greater than 8 $g/cm^3$, such as, but not limited to, lead and its alloys (e.g. 90/10 Pb/Sn). In a further embodiment, the high permittivity material is any commonly known material having a density greater than 10 $g/cm^3$, such as, but not limited to, tungsten, gold and platinum, iridium and their alloys. In embodiments where high permittivity material 205 comprises a plurality of particles, as discussed below, each particle has a density greater than 8 $g/cm^3$. Depending on the packing density of the plurality of particles the density of the plurality as a whole may be significantly less than 8 $g/cm^3$.

Generally, high permittivity material 105 should have a shape which provides the greatest space filling with the lowest friction and lowest potential to bind within chamber 111. The greater the space filling capability, the more the volume of chamber 111 between electrode 108 and electret 110 will be filled with high permittivity material 105 and the greater the variation in capacitance over a given generator cycle. Low friction is important to reduce the amount of thermal energy losses from generator cell 100 for a given kinetic energy input. In an embodiment, high permittivity material 105 is comprised of a solid mass with an approximately spherical geometry, i.e. a bead, or a plurality of particles, which may also be spherical, as shown in FIGS. 1A, 1B, and 1C. A spherical geometry provides the opportunity for the high permittivity material to roll within the chamber for minimal frictional losses. A spherical geometry also reduces the contact area between high permittivity material 105 and the floor 101, ceiling 102 and sidewall 103, lowing friction even if high permittivity material 105 slides rather than rolls within chamber 111 rather than rolling.

In an embodiment, high permittivity material 105 is deformable. A deformable high permittivity material 105 flows and is able to fill the space between electrode 108 and electret 110 when cell 100 has been displaced by a distance equal to approximately the chamber length $L_3$ in a direction parallel to $L_3$. In a particular embodiment, upon such displacement of cell 100, high permittivity material 105 having a first shape that does not fill the cross section of the chamber defined by height $H_3$ and width $W_3$ of chamber 111 (as shown in FIG. 1B) collides with sidewall 103 and deforms to a second shape which does fill that cross section (as shown in FIG. 1C). In this manner, the deformable high permittivity material 105 is able to traverse chamber length $L_3$ without continuously contacting floor 101, ceiling 102 and sidewall 103, thereby reducing friction. Yet, at the end of the generator "stroke," when cell 100 has been displaced by a distance equal to $L_3$, high permittivity material 105 collects in the a portion of volume between floor 101, ceiling 102 and sidewall 103 between electrodes 108 and 109 for maximum change in permittivity.

In an embodiment, the high permittivity material 105 comprises a plurality of particles approximating a highly deformable solid or fluid. The smaller the particle diameter, the greater the number required to fill a particular volume of chamber 111, so the optimal size of the particle is dependent on the volume of chamber 111. The greater the number of particles, the closer high permittivity material 105 can be approximated as a fluid rather than discrete, nondeformable, solid particles. With decreasing particle size, the fluid approximation improves as does the ability for high permittivity material to deform and fill a given space. However, the lower limit on particle size is dependent on particle density because too light of a particle will lack the inertia required to overcome triboelectric charging effects, as previously discussed.

In a particular embodiment, each roughly spherical particle of the plurality is a lead alloy having density greater than approximately 8 g/cm$^3$ and a diameter of approximately 250 um. In an alternate embodiment, where each roughly spherical particle in the plurality has a very high density, greater than approximately 8 g/cm$^3$, the minimum diameter of each particle is approximately 100 um. As the density of high permittivity material increases, the material may be comprised of a plurality of particles wherein in each particle has a smaller diameter while still retaining sufficient mass to overcome triboelectric charging effects.

In an alternate implementation, high permittivity material 105 includes at least some particles which are least weakly magnetic. Magnetic particles can interact with other particles that are magnetically susceptible. Magnetic particles are advantageous because the plurality will more closely approximate a solid because of the magnetic binding force between individual particles. In a particular embodiment, magnetic particles with a diameter below 100 um aggregate to form high permittivity material 105. The magnetic force between particles is sufficient to overcome triboelectric charging effects that would otherwise impede the relative motion of the particle as generator 100 is displaced during operation. Weakly magnetic particles are advantageous because high permittivity material 105 will still be deformable as the particles are not rigidly bound by magnetic force.

In another embodiment, high permittivity material 105 includes particles coated with the same material as at least one of the floor 101, ceiling 102 and sidewall 103. In this manner, triboelectric charging effects can be essentially eliminated because the high permittivity material 105 and floor 101, ceiling 102 and sidewall 103 will be at equal electrochemical potentials and no charge exchange should occur. Such embodiments enable the particles to have a diameter less than 100 um. In a particular embodiment, high permittivity material 105 is coated with fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide, polyvinylidene fluoride, (PVDF), fluorinated glass, carbon doped silicon oxides, and porous dielectrics with 1-10% porosity.

As shown in FIGS. 1A-1C, in an embodiment of the invention, high permittivity material is made of a plurality of particles of a substantially uniform size. In a further embodiment, the plurality of particles is of a substantially uniform density. Uniform particle size and density are both advantageous because when individual particles have near equal mass, and therefore near equal inertia at rest, the plurality move relative to cell 100 in near unison and approximate a single massive particle equal to the cumulative mass of the plurality of particles. This approximation of a single mass increases the amount of permittivity variation, increasing the change in capacitance, $C_1$. Ideally, each particle of the plurality moves relative to cell 100 when the cell 100 is displaced. In an alternate embodiment, the plurality of particles has a distribution of diameters ranging from approximately 100 um to 400 um. A distribution of sizes advantageously enables the plurality to have a subset of relatively large particles with very high inertia and also a subset of relatively small particles to approximate a deformable material as previously discussed.

Figure 2A:
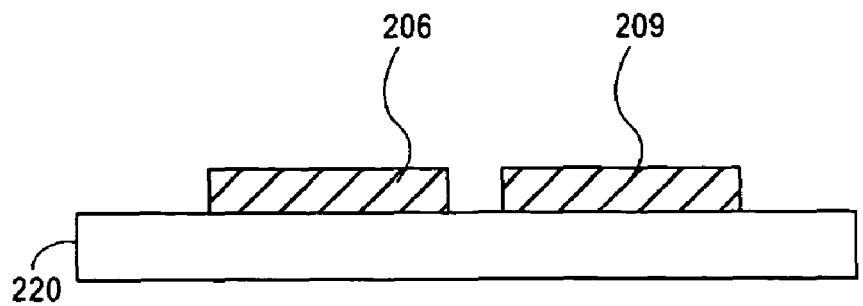
FIGS. 2A-2G depict cross-sectional views of a method of manufacturing an electret power generator cell in accordance with an embodiment of the invention.

Referring to FIG. 2A, in one embodiment, electret power generator manufacture begins with a first substrate 220. As previously discussed, substrate 220 may be of any commonly known material providing suitable support for electrodes 206 and 209, such as but not limited to polyimide, polyetherimide, fluoropolymer, fluorinated glass and porous dielectrics. Electrodes 206 and 209 are then formed coplanar on substrate 220 using commonly known deposition and patterning techniques. Electrodes 206 and 209 may be of any material commonly used, such as, but not limited to, polysilicon, aluminum, copper, gold and tungsten. Because electrostatic power generators are low current devices, electrodes 206 and 209 need not have a particularly low resistivity. Deposition may be performed by various means, such as, physical or chemical vapor deposition, evaporative deposition, electroplating and electro-less deposition. Patterning may be by either liftoff or each using commonly known techniques, such as liftoff lithography. During patterning of electrodes 206 and 209, routing circuitry (not shown) may also be patterned on substrate 220. In a particular embodiment, electrodes 206 and 209 are electrically connected to separate contact pads formed in substrate 220.

Figure 2B:
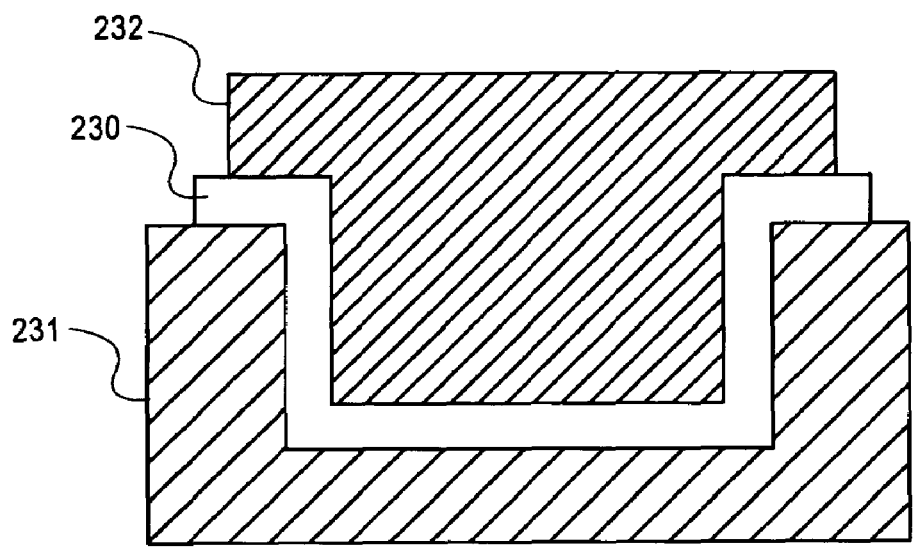

Next, as shown in FIG. 2B an electret is formed in a first dielectric film over the electrodes 206 and 209. First dielectric film 230 may be any film able to provide sufficient structural rigidity to contain a mobile high permittivity material within a generator cell while keeping fringing capacitances to a minimum. In one embodiment, as previously described, first dielectric film 230 is a commonly known film having a dielectric constant below 3.5, such as, but not limited to fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide (e.g. Kapton® Type 150 FCR available from DuPont), fluorinated glass, carbon doped silicon oxides, and porous dielectrics with 1-10% porosity. In another embodiment, first dielectric film 230 is a commonly known thermoplastic or thermoset material, such as, but not limited to polycarbonate, polyolefins, polymethylmethacrylate, polystyrene, acetals, polyphenyloxide, nylons, polyester, polyetheretherketones (PEEK), and liquid crystal polymers. In a first embodiment, as shown in FIG. 2B, first dielectric film 230 is molded into a well having a floor and sidewall prior to forming the electret. First dielectric film 230 may be molded using commonly known techniques. In one embodiment, as shown in FIG. 2B, a tool 232 and die 231 is used to pressure mold first dielectric film 230. In another embodiment, vacuum molding is used to form the well using die 231.

Figure 2C:
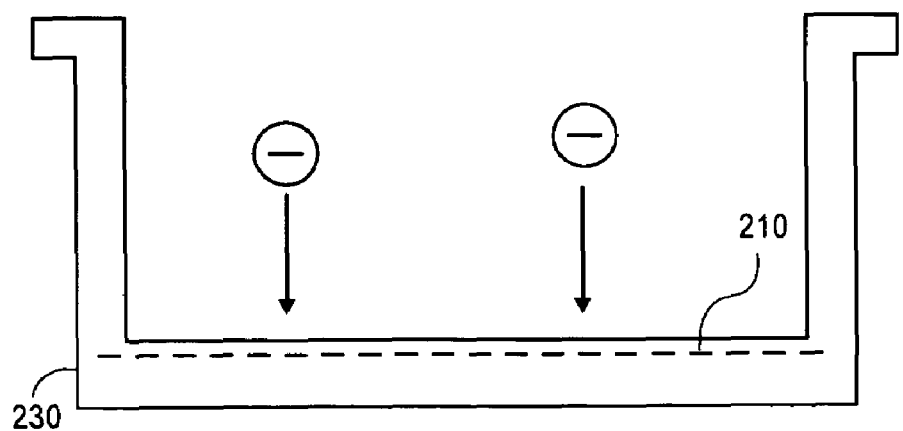

As shown in FIG. 2C, electret 210 is formed in a portion of first dielectric film 230. Formation of electret 210 may be performed by any commonly known means, such as corona discharge, capable of achieving a high charge density that is very uniform to produce a strong and uniform electric field external to electret 210. In an embodiment, negative charge is embedded in electret 210 at the bottom of the well, as shown in FIG. 2C, to a depth less than the thickness of first dielectric film 230. In a further embodiment the negative charge is in the form of electrons providing a charge density of at least $1 \times 10^{-4}$ Coulombs/m$^2$ and a peak-to-peak electric field non-uniformity of 5% or less.

Figure 2D:
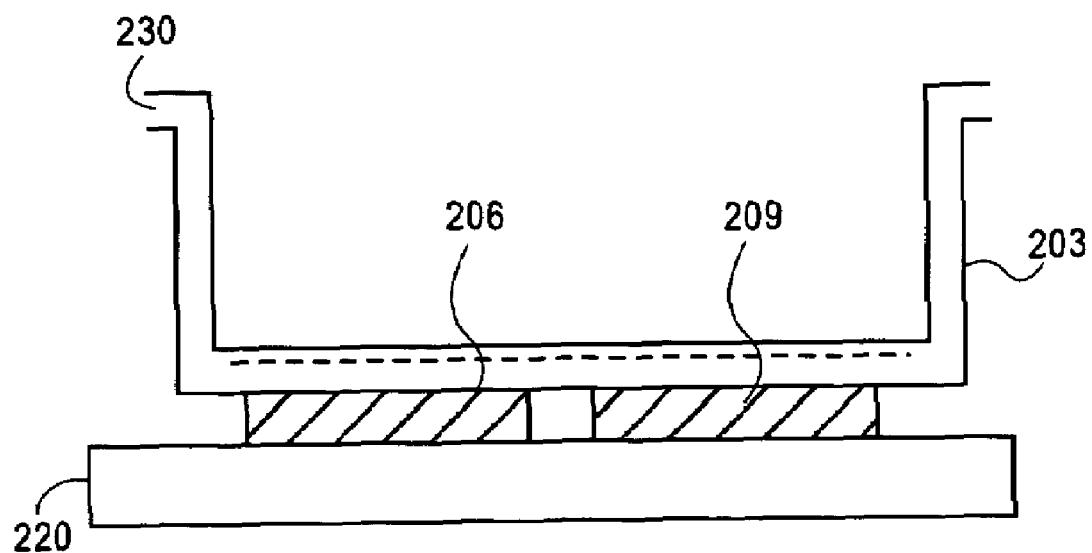

Next, as shown in FIG. 2D, first dielectric film 230 is affixed to substrate 220. In one embodiment, a well formed in first dielectric film 230 is first aligned to circumscribe electrodes 206 and 209. To minimize fringing capacitances, one embodiment aligns first dielectric film 230 to substrate 220 so that the sidewall 203 of the well forms a perimeter spaced outside of the outer edge of electrodes 206 and 209 by at least 0.1% of the width of electrode (into the plane in FIG. 2C) and by at least 0.1% of the total length of the electrodes 206 and 209 as measure from the outside edge of electrode 206 to the outside edge of electrode 209 including the spacing between electrodes 206 and 209. Once aligned, first dielectric film 230 is bonded in position on substrate 220 with an adhesive or other commonly known means.

Figure 2E:
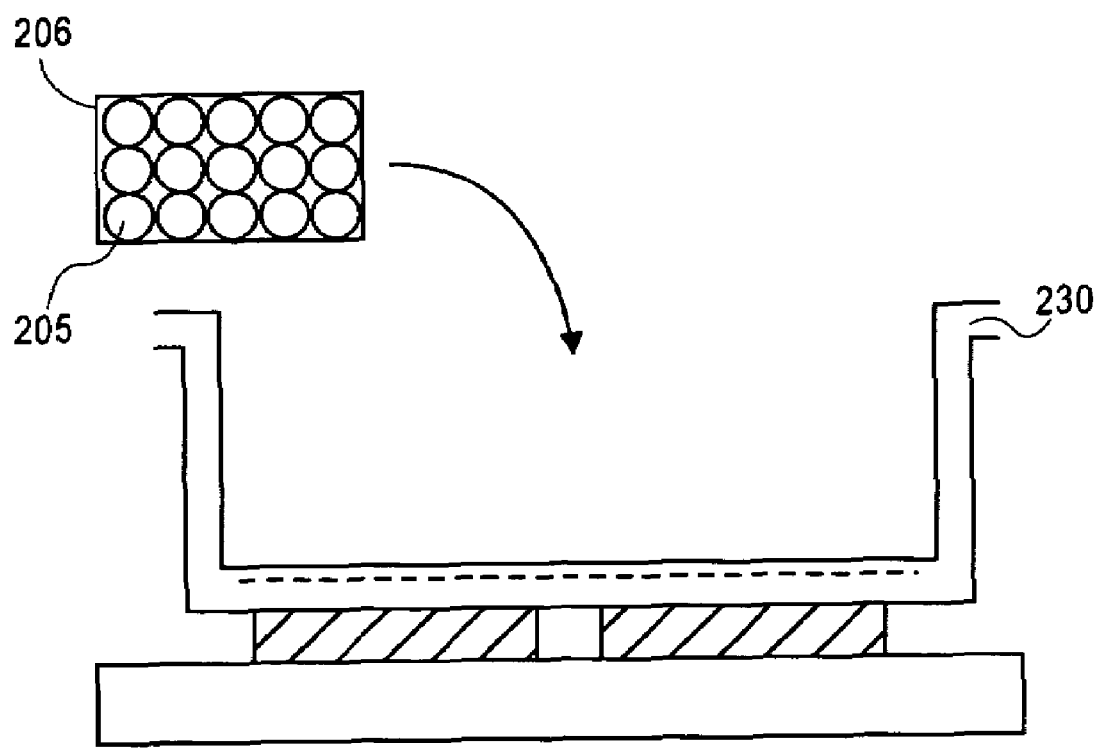

Next, as shown in FIG. 2E, a portion of the open well is filled with high permittivity material 205. As previously discussed, the volume of the chamber filled by high permittivity material is important in achieving a high generator cell output. Thus, for a given chamber volume a pre-selected amount of high permittivity material must be accurately and precisely deposited into the well. This task is made more difficult in embodiments employing particles as small as 100 um in diameter and/or in embodiments employing a distribution of particle diameters. In one implementation, the volume of a die 206 is first completely filled with high permittivity material 205 and the die contents then transferred to the well. Die 206 may be fabricated of the same material as high permittivity material 205 to reduce static charge build up which can prevent a complete transfer of high permittivity material 205. The volume of the die has a total volume equal to the portion of chamber volume to be filled. In a further embodiment, multiple dies are filled with particles of differing diameter to fill the well with a plurality of particles with a measured distribution of sizes. In further embodiments, a vacuum system (not shown) can be attached to die 206 to enable die 206 to be rapidly filled from a reservoir and then emptied into the well when vacuum is terminated.

Figure 2F:
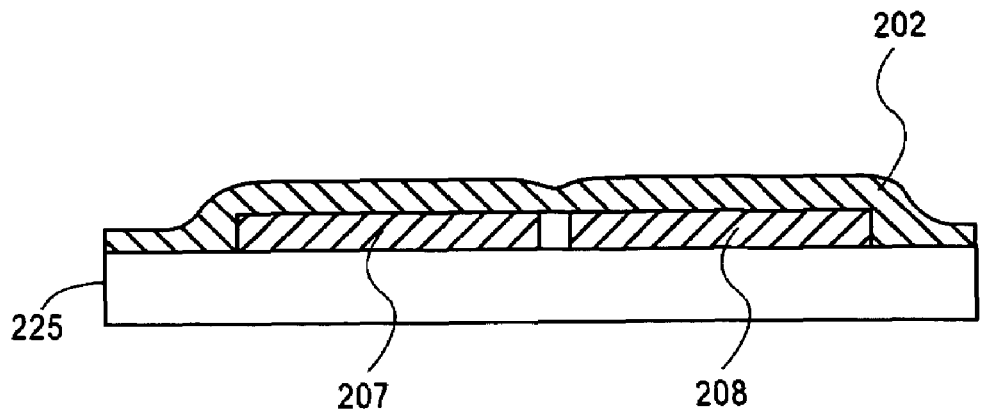

Next, as shown in FIG. 2F, a second pair of coplanar electrodes 207 and 208 is formed on substrate 225 in the same manner as described for substrate 220. Like substrate 220, substrate 225 may be any material that provides suitable support and in one embodiment is a material having a dielectric constant below 3.5. A protective film 202 is then laminated or bonded with adhesive onto substrate 225 over electrodes 207 and 208 to prevent the high permittivity material from contacting the electrodes 207 and 208 during operation of the generator cell.

Figure 2G:
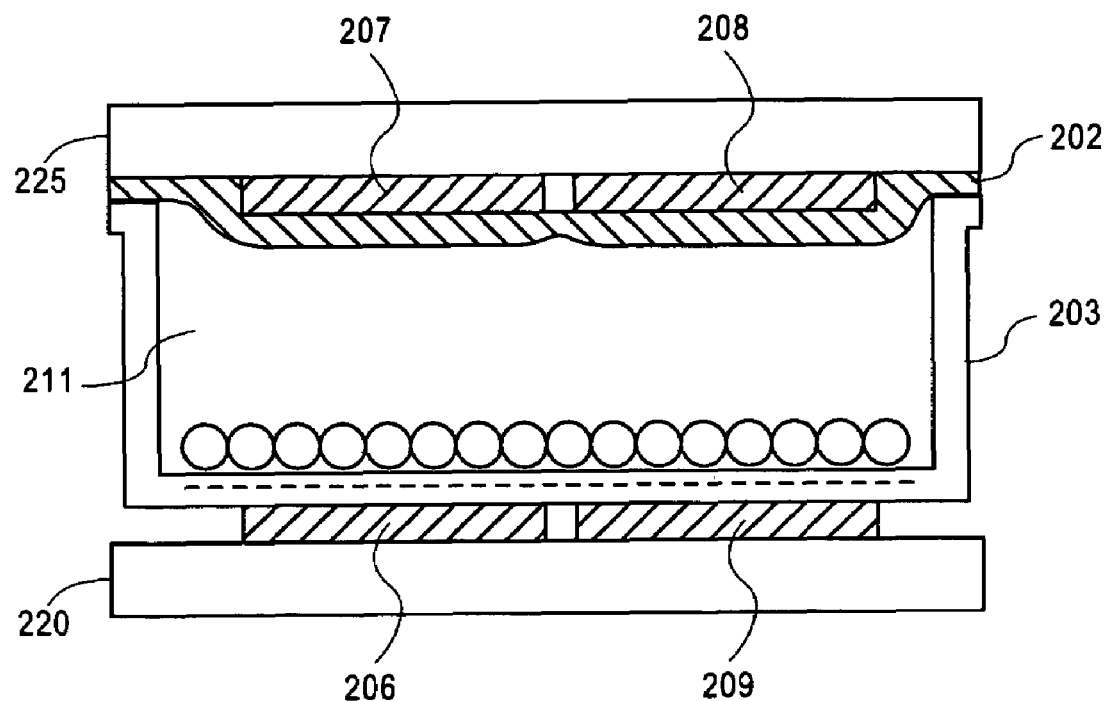
Figure 3A:
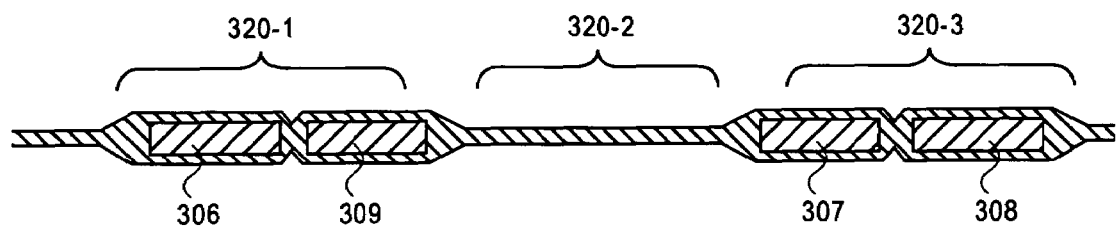
FIGS. 3A-3E depict cross-sectional views of a method of manufacturing an electret power generator cell in accordance with an embodiment of the invention.
Figure 3B:
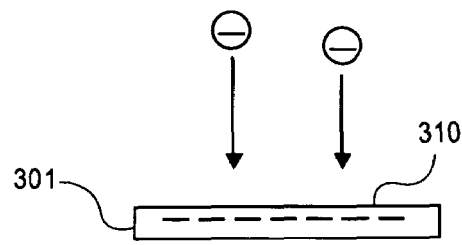
Figure 3C:
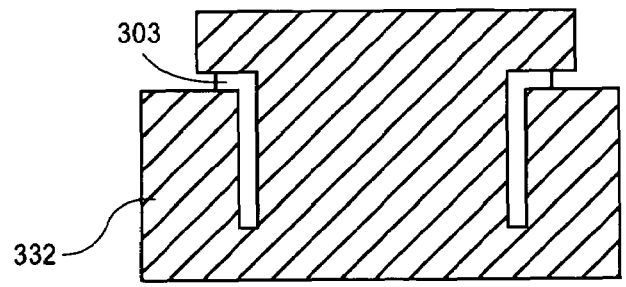
Figure 3D:
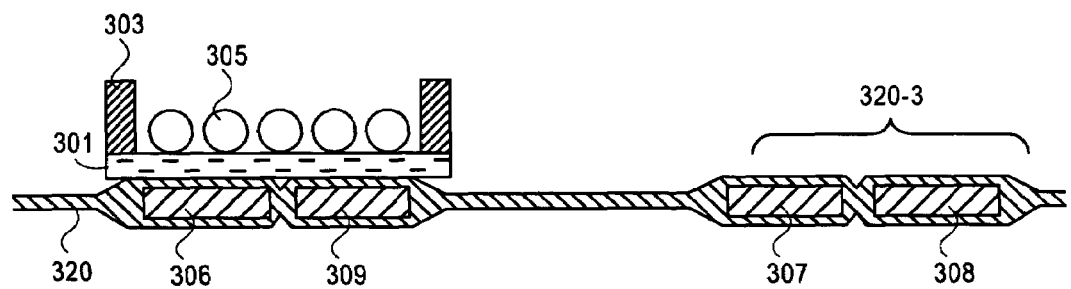
Figure 3E:
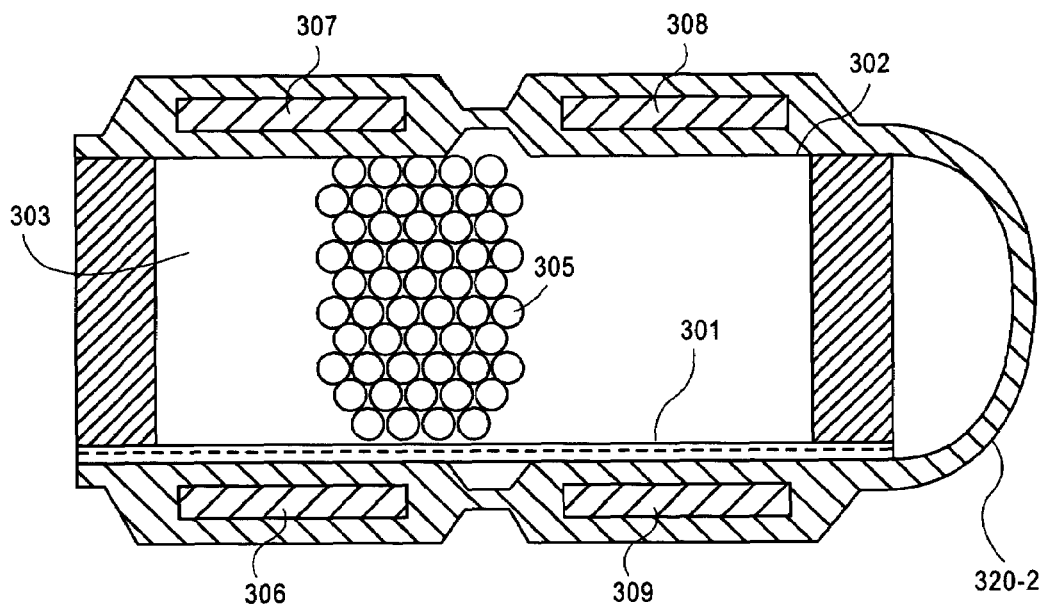

Finally, as shown in FIG. 2G, substrate 225 is inverted, aligned, and joined to the sidewall 203 of the well to enclose a chamber 211 containing the high permittivity material 205. In a particular embodiment, substrate 225 is aligned to substrate 220 to surround the electrodes 207 and 208 with sidewalls 203 of the well. To minimize fringing capacitances, one embodiment aligns substrate 225 to substrate 220 so that the sidewall 203 of the well forms a perimeter spaced outside of the outer edge of electrodes 207 and 208 by at least 0.1% of the width of electrode (into the plane in FIG. 6g) and by at least 0.1% of the total length of the electrodes 207 and 208 as measure from the outside edge of electrode 207 to the outside edge of electrode 208 including the spacing between electrodes 207 and 208. Once aligned, substrate 225 is joined to substrate 220 using commonly known techniques. In a particular embodiment, an epoxy is applied on the external surfaces of substrates 220 and 225 at a location remote from the generator cell pictured to provide a clamping force across the two substrates 220 and 225. Thus, an electrostatic power generator cell including two variable capacitors is substantially completed and ready to be electrically coupled to other generator cells, conditioning circuitry, and a load.

In an alternate embodiment, a generator cell is manufactured using a partial Z-fold methodology wherein a single film is folded onto itself with a chamber and electret between the layers of the folded film. This method is highly scalable because a continuous film can be repeatedly folded in alternating directions to create a vertical stack of generator cells. Similarly, the single film can form in parallel a number of adjacent generator cells in a single level.

The method begins with forming electrodes 306 and 309 in region 320-1 of a film 320 and forming electrodes 307 and 308 in region 320-3 of the film, as shown in FIG. 4A. As shown, electrodes may be embedded in the film 320. Alternatively, electrodes may be formed on one or both sides of film 320. Region 320-1 and region 320-3 are separated by region 320-02 of the film. Film 320 may be any material having sufficient structural support for the generator cell with minimal thickness and capacitance. In a particular embodiment, film 320 has a dielectric constant below 3.5. A low capacitance material is advantageous because film 320 provides as the only separation between adjacent generator cells in a vertical stack. Film 320 may be any commonly known film, such as, but not limited, to but not limited to polyimide (e.g. Kapton® Type 150 FCR available from DuPont). Commonly known techniques for embedding electrodes 306-309 along with supporting circuitry into the film 320 may be used.

Next, and electret, as shown in FIG. 4B, is formed in a portion of dielectric film 301. Formation of electret 310 may be performed by any commonly known means, such as corona discharge, capable of achieving a high charge density that is very uniform to produce a strong and uniform electric field external to electret 310. In an embodiment, negative charge is embedded in electret 310 to a depth less then the thickness of dielectric film 301. In a further embodiment the negative charge is in the form of electrons providing a charge density of at least $1 \times 10^4$ Coulombs/m$^2$ and a peak-to-peak electric field non-uniformity of 5% or less.

As shown in FIG. 4C, a dielectric film is molded, cast, or stamped to form a through via having a sidewall 303 with the desired chamber height and shape. For example, in embodiments having a cylindrical generator cell, the second dielectric film is formed in the shape of an o-ring while. Similarly, a four-cornered spacer is formed for embodiments having a box-like chamber. In one embodiment sidewall 303 is formed of a commonly known film having a dielectric constant below 3.5, such as, but not limited to polydimethylsiloxane (PDMS) (e.g. Sylgard 184® available from Dow Corning), fluoropolymer (e.g. ethylene-propylene (FEP), perfluoroalkoxy polymer (PFA), polytetrafluoroethylene (PTFE) all available under the Teflon® trade name from DuPont), polyetherimide (e.g. Ultem® available from General Electric), polyimide (e.g. Kapton® Type 150 FCR available from DuPont), Polyvinylidene fluoride (PVDF), fluorinated glass, carbon doped silicon oxides, and porous dielectrics with 1-10% porosity.

Next, dielectric film 301 and sidewall 303 are joined to film 320 at region 320-1, as shown in FIG. 4D. Dielectric film 301 is aligned to cover electrodes 306 and 309. Once aligned, dielectric film 310 may be laminated or bonded to film 320. Sidewall 303 is than aligned with region 320-1. In one embodiment, sidewall 303 is aligned to circumscribe electrodes 306 and 309. To minimize fringing capacitances, one embodiment aligns sidewall 303 to region 320-1 so that the sidewall 303 of the well forms a perimeter spaced outside of the outer edge of electrodes 306 and 309 by at least 0.1% of the width of electrode (into the plane in FIG. 4C) and by at least 0.1% of the total length of the electrodes 306 and 309 as measured from the outside edge of electrode 306 to the outside edge of electrode 309 including the spacing between electrodes 306 and 309. Once aligned, sidewall 303 is affixed in position on film 320 with an adhesive or other commonly known means. It should be appreciated that sidewall 303 need not itself be physically adhered to film 320 at region 320-01 and instead the adhesive may be applied in a remote location if sidewall 303 remains attached to a larger film.

With the sidewall 303 over the electret 310, a portion the open chamber or well is then filled with high permittivity material 305. As previously discussed, the volume of the chamber filled by high permittivity material is of importance to achieving a high generator cell output. Thus, for a given chamber volume a pre-selected amount of high permittivity material 305 must be accurately and precisely deposited into the well. This task is made more difficult in embodiments employing particles as small as 100 um in diameter and/or in embodiments employing a distribution of particle diameters. In one implementation, the volume of a die is first completely filled with high permittivity material 305 and the die contents then transferred to the well. The volume of the die has a total volume equal to the portion of chamber volume to be filled. In a further embodiment, multiple dies are filled with particles of differing diameter to fill the well with a plurality of particles with a measured distribution of sizes. In further embodiments, a vacuum system (not shown) can be attached to the die to enable the die to be rapidly filled from a reservoir and then emptied into the well when vacuum is terminated.

Finally, film 320 is folded over and joined to sidewall 303 to enclose the chamber. As shown in FIG. 4E, region 320-3 is folded over region 320-1 with region 320-2 spanning the sidewall 103, as shown in FIG. 4E. Region 320-3 is aligned with region 320-1 to surround the electrodes 307 and 308 with sidewall 303 of the well. To minimize fringing capacitances, one embodiment aligns region 320-3 to region 320-1 such that sidewall 303 of the well forms a perimeter spaced outside of the outer edge of electrodes 307 and 308 by at least 0.1% of the width of electrode (into the plane in FIG. 4E) and by at least 0.1% of the total length of the electrodes 307 and 308 as measure from the outside edge of electrode 307 to the outside edge of electrode 308 including the spacing between electrodes 307 and 308. Once aligned, folded film 320 is joined to itself using commonly known techniques. In a particular embodiment, an epoxy is applied on the external surfaces of regions 320-1 and 320-3 to provide a clamping force across the two regions of film 320. In another embodiment, epoxy is applied at an edge location remote from the generator cell pictured. Thus, an electrostatic power generator cell including two variable capacitors is substantially completed and ready to be electrically coupled to other generator cells, conditioning circuitry, and a load.

It should be appreciated features of the various manufacturing implementations described may be utilized in alternate combinations. For example, a dielectric film formed into a well and embedded with charge to form an electret described in one implementation may be incorporated with the partial Z-Fold implementation just described. Although the present invention has been described in language specific to structural features and/or methodological acts, it is to be understood that the invention defined in the appended claims is not necessarily limited to the specific features or acts described. The specific features and acts disclosed are instead to be understood as particularly graceful implementations of the claimed invention useful for illustrating the present invention.

What is claimed is:

1. A power generator comprising:
 a pair of electrodes with an electret and chamber there between, the chamber having a sidewall defining a length and width of the chamber, wherein at least one of the width and length of the chamber is greater than the width or length of at least one of the pair of electrodes;
 a high permittivity material occupying a portion of the chamber, the high permittivity material movable relative to the pair of electrodes to vary the capacitance between the electret and one of the pair of electrodes, wherein the high permittivity material is selected from the group consisting of iridium, platinum, gold, tungsten, and lead.

2. The power generator of claim 1, wherein the sidewall comprises a material selected from the group consisting of polyimide, polyetherimide, fluoropolymer, fluorinated glass, carbon doped silicon oxide, and porous dielectrics.

3. The power generator of claim 2, wherein the sidewall comprises a material having a surface resistivity less than $10^{14}$ ohms/square.

4. The power generator of claim 3, wherein the sidewall comprises a thermoplastic or thermoset material selected from the group consisting of polyimide, polyetherimide, polycarbonate, polyolefins, polymethylmethacrylate, polystyrene, acetals, polyphenyloxide, nylons, polyester, PEEK, Liquid Crystal Polymers.

5. The power generator of claim 1, wherein at least one of the high permittivity material, the first electrode, and second electrode is coated with a material selected from the group consisting of polyimide, polyetherimide, fluoropolymer, polyvinylidene fluoride, (PVDF), fluorinated glass, and carbon doped silicon oxide.

6. The power generator of claim 1, wherein the high permittivity material occupies less than 50% of the total chamber volume.

7. The power generator of claim 6, wherein the high permittivity material comprises a plurality of particles additively occupying a total volume between 20% and 50% of the chamber volume.

8. The power generator of claim 7, wherein each of the plurality of particles is a bead having a minimum diameter of 100 um.

9. The power generator of claim 7, wherein the plurality of particles have distribution of diameters ranging from 100 um to 400 um.

10. The power generator of claim 7, wherein the plurality of particles are of a substantially uniform size.

11. A power generator comprising:
 a first pair of coplanar electrodes on a first substrate;
 a first dielectric film over the first pair of coplanar electrodes to form a floor and a sidewall of a chamber;
 a second pair of coplanar electrodes on a second substrate coupled to the first pair of coplanar electrodes, the second pair of coplanar electrodes coated with a second dielectric film to enclose the chamber;
 an electret adjacent to at least one electrode of each pair of coplanar electrodes; and
 a high permittivity material occupying a portion of the chamber, the high permittivity material movable relative to the first and second pair of electrodes to vary the capacitance of each of the first and second capacitors.

12. The power generator of claim 11, wherein the high permittivity material comprises a plurality of particles additively occupying a total volume less than 50% of the chamber volume.

13. The power generator of claim 11, wherein at least one of the first and second dielectric films is selected from the group consisting of polyimide, polyetherimide, fluoropolymer, fluorinated glass, carbon doped silicon oxide, and porous dielectrics.

14. The power generator of claim 11, wherein the region of the film comprising the electret is between approximately 0.5 mil and 10 mil in thickness.

15. The power generator of claim 11, wherein the second film has a thickness between approximately 0.1 mil and 5 mil.

16. The power generator of claim 11, wherein the chamber is at least partially evacuated.

17. The power generator of claim 11, wherein the chamber length is no greater than the peak-to-peak amplitude of the dominant vibration of a particular environment.

18. The power generator of claim 11, wherein the chamber length is between 0.75 mm and 5 mm.

19. The power generator of claim 11, wherein the chamber height is between 0.4 mm and 1 mm.

20. The power generator of claim 11, wherein at least one of the pairs of coplanar electrodes has a width that is at least 0.1% less than the width of the chamber and a total length that is at least 0.1% less than the length of the chamber.

21. The power generator of claim 11, wherein the substrate comprises a material having a dielectric constant less than approximately 3.5.

22. The power generator of claim 11, wherein at least one of the first and second substrate is a material selected from the group consisting of polyimide, polyetherimide, fluoropolymer, fluorinated glass, and porous dielectrics.

23. The power generator of claim 11, wherein at least one of the first and second substrate has a thickness between approximately 1 mil and 15 mil.

24. The power generator of claim 11, wherein at least one of the first and second substrate has a notch between the pair of coplanar electrodes.

25. A power generator comprising:
 a first film having a first region and second region, the second region being parallel to the first region with a chamber and an electret there between;
 a first electrode in the first region adjacent to the electret and a second electrode in the second region, the second electrode parallel to the first electrode; and
 a high permittivity material occupying a portion of the chamber, the high permittivity material movable within the chamber to vary the capacitance between the second electrode and the electret.

26. The power generator of claim 25, further comprising a second film between the first and second regions of the first film to form a sidewall of the chamber.

27. The power generator of claim 26, wherein the second film further comprises a floor of the chamber, the floor being parallel to the first electrode.

28. The power generator of claim 27, wherein the second film comprises the electret adjacent to the first electrode.

29. The power generator of claim 25, wherein a third film comprises the electret adjacent to the first electrode.

30. The power generator of claim 25, wherein the first and second films are materials selected from the group consisting of polyimide, polyetherimide, fluoropolymer, fluorinated glass, carbon doped silicon oxide, and porous dielectrics.

* * * * *